(12) United States Patent
Little

(10) Patent No.: US 7,351,346 B2
(45) Date of Patent: Apr. 1, 2008

(54) NON-PHOTOLITHOGRAPHIC METHOD FOR FORMING A WIRE GRID POLARIZER FOR OPTICAL AND INFRARED WAVELENGTHS

(75) Inventor: Michael J. Little, Oak Park, CA (US)

(73) Assignee: Agoura Technologies, Inc., El Dorado Hills, CA (US)

( * ) Notice: Subject to any disclaimer, the term of this patent is extended or adjusted under 35 U.S.C. 154(b) by 58 days.

(21) Appl. No.: 11/001,449

(22) Filed: Nov. 30, 2004

(65) Prior Publication Data

US 2006/0113279 A1    Jun. 1, 2006

(51) Int. Cl.
*C23F 1/00* (2006.01)
*B44C 1/22* (2006.01)

(52) U.S. Cl. .................. 216/41; 359/437; 427/163.1
(58) Field of Classification Search ............ None
See application file for complete search history.

(56) References Cited

U.S. PATENT DOCUMENTS

| | | | |
|---|---|---|---|
| 3,046,839 A | 7/1962 | Bird et al. | 427/163.1 |
| 4,049,944 A | 9/1977 | Garvin et al. | 219/121.2 |
| 4,456,515 A | 6/1984 | Krueger et al. | 204/192.27 |
| 5,422,756 A | 6/1995 | Weber | 359/487 |
| 5,559,634 A | 9/1996 | Weber | 359/638 |
| 5,808,794 A | 9/1998 | Weber et al. | 359/487 |

(Continued)

FOREIGN PATENT DOCUMENTS

DE    10101025    8/2002

(Continued)

OTHER PUBLICATIONS

N. Bowden et al., "The Controlled Formation of Ordered, Sinusoidal Structures by Plasma Oxidation of an Elastomeric Polymer", *Applied Physics Letters*, vol. 75, No. 17 (Oct. 25, 1999). pp. 2557-2559.

(Continued)

*Primary Examiner*—Allan Olsen
(74) *Attorney, Agent, or Firm*—Joshua D. Isenberg; JDI Patent

(57) ABSTRACT

A method for forming a plurality of parallel metal lines on a substrate of thin film elastomeric material and a wire grid polarizer formed by such method. A sacrificial layer is formed by coating the substrate with a water soluble polymer while the substrate is stretched. The existing tensile force is removed, leaving an undulating topology of buckled sacrificial layer material. A masking layer is then deposited at an oblique angle and then fractured into parallel lines of material by application of a second tensile force. Unmasked portions of the sacrificial layer are removed by dry etch. A metallic layer is then deposited and a lift off process employed to remove remaining portions of the sacrificial layer and materials deposited thereover. Upon removal of the second tensile force, the substrate returns to its unstressed length with metal lines of predetermined periodicity thereon.

18 Claims, 3 Drawing Sheets

U.S. PATENT DOCUMENTS

| | | | |
|---|---|---|---|
| 5,825,542 A | 10/1998 | Cobb, Jr. et al. | 359/487 |
| 5,828,488 A | 10/1998 | Ouderkirk et al. | 359/487 |
| 5,986,730 A | 11/1999 | Hansen et al. | 349/96 |
| 6,025,897 A | 2/2000 | Weber et al. | 349/96 |
| 6,081,376 A | 6/2000 | Hansen et al. | 359/485 |
| 6,088,159 A | 7/2000 | Weber et al. | 359/487 |
| 6,096,375 A | 8/2000 | Ouderkirk et al. | 427/163.1 |
| 6,101,032 A | 8/2000 | Wortman et al. | 359/500 |
| 6,108,131 A | 8/2000 | Hansen et al. | 359/486 |
| 6,122,103 A | 9/2000 | Perkins et al. | 359/486 |
| 6,208,463 B1 | 3/2001 | Hansen et al. | 359/486 |
| 6,234,634 B1 | 5/2001 | Hansen et al. | 353/20 |
| 6,243,199 B1 | 6/2001 | Hansen et al. | 359/486 |
| 6,274,007 B1 | 8/2001 | Smirnov et al. | 204/192.13 |
| 6,288,840 B1 | 9/2001 | Perkins et al. | 359/486 |
| 6,348,995 B1 | 2/2002 | Hansen et al. | 359/486 |
| 6,356,389 B1 | 3/2002 | Nielsen et al. | 359/625 |
| 6,447,120 B1 | 9/2002 | Hansen et al. | 353/20 |
| 6,449,092 B1 | 9/2002 | Weber et al. | 359/487 |
| 6,452,724 B1 | 9/2002 | Hansen et al. | 359/486 |
| 6,543,153 B1 | 4/2003 | Weber et al. | 34/96 |
| 6,665,119 B1 | 12/2003 | Kurtz et al. | 359/486 |
| 7,106,507 B2 | 9/2006 | Lee et al. | 359/486 |
| 2001/0028925 A1* | 10/2001 | Moshrefzadeh et al. | 427/552 |
| 2002/0044351 A1 | 4/2002 | Nilsen | 359/483 |
| 2002/0170497 A1 | 11/2002 | Smirnov et al. | 118/723 |
| 2004/0008310 A1* | 1/2004 | Leidig et al. | 349/124 |
| 2004/0027676 A1 | 2/2004 | Nilsen et al. | 359/619 |
| 2004/0169791 A1 | 9/2004 | Nilsen et al. | 349/96 |
| 2005/0046943 A1* | 3/2005 | Suganuma | 359/497 |
| 2006/0072194 A1 | 4/2006 | Lee | 359/486 |
| 2006/0082700 A1* | 4/2006 | Gehlsen et al. | 349/64 |
| 2006/0098140 A1 | 5/2006 | Lee | 349/98 |
| 2006/0159958 A1 | 7/2006 | Lee | 428/690 |

FOREIGN PATENT DOCUMENTS

| | | |
|---|---|---|
| JP | 2005 195824 | 7/2005 |
| JP | 2006 047813 | 2/2006 |
| JP | 2006 118028 | 5/2006 |
| JP | 2006 201504 | 8/2006 |
| JP | 2006 224659 | 8/2006 |
| WO | WO01/23916 | 4/2001 |
| WO | WO01/29549 | 4/2001 |
| WO | WO01/49476 | 7/2001 |

OTHER PUBLICATIONS

N. Bowden et al., "Spontaneous Formation of Ordered Structures in Thin Films of Metals Supported on an Elastomeric Polymer", *Nature*, vol. 393 (May 14, 1998), pp. 146-149.

W.T.S. Huck et al., "Ordering of Spontaneously Formed Buckles on Planar Surfaces", *Langmuir 2000*, vol. 16, No. 7 (2000), pp. 3497-3501.

F. Katzenberg, "Cost-Effective Production of Highly REgular Nanostructured Metallization Layers", *Nanotechnology*, vol. 14 (2003), pp. 1019-1022.

F. Katzenberg, "Irradiation- and Strain-Induced Self-Organization of Elastomer Surfaces", *Macromolecular Materials and Engineering*, vol. 286, No. 1 (2001), pp. 26-29.

Masahide Kimura, "Realizing wire grid polarizer films with 120nm pitches controlled microstructure on large area For LCD panels With Nano imprint technology" Nikkei Microdevices, Dec. 2005 p. 156-157, Nikkei Business Publications, Inc. Tokyo, Japan.

Masahide Kimura, "Realizing wire grid polarizer films with 120nm pitches controlled microstructure on large area For LCD panels With Nano imprint technology" Nikkei Microdevices, Dec. 2005 p. 156-157, Nikkei Business Publications, Inc. Tokyo, Japan (English Translation).

Masahide Kimura, *Tech-On*, "Asahi Kasei wire grid polarizer film with 120nm pitch with nano technology", Yokohama, Japan Oct. 21, 2005.

Masahide Kimura, *Tech-On* "Asahi Kasei wire grid polarizer film with 120nm pitch with nano technology" Asahi Kasei Corporation, Yokohama, Japan Oct. 21, 2005 (English Translation).

Sang Hoon Kim et al, "Fabrication of a nano-wire grid polarizer for brightness enhancement in liquid crystal display" Aug. 14, 2006, p. 4436-4438, Nanotechnology 17, Institute of Physics Publishing.

Wolfgang Karthe, *Nanofabrication Technologies and Device Integration*, Proceedings of SPIE, vol. 2213,- B. Stenkamp, "Grid Polarizer for the Visible Spectral Region", p. 288-296, Jul. 1994.

"Definition of elastic- Merriam-Webster Online Dictionary"—downloaded from the internet <http://209.161.33.50/dictionary/elastic>, downloaded on Mar. 16, 2007.

"Definition of elastomer—Merriam—Webster Online Dictionary", downloaded from the internet <http://209.161.33.50/dictionary/elastomer>, downloaded on Mar. 16, 2007.

* cited by examiner

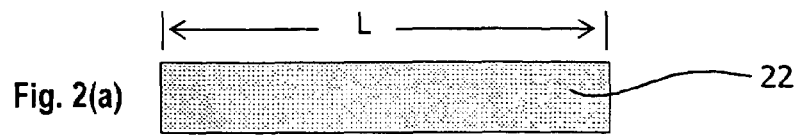
Fig. 2(a)
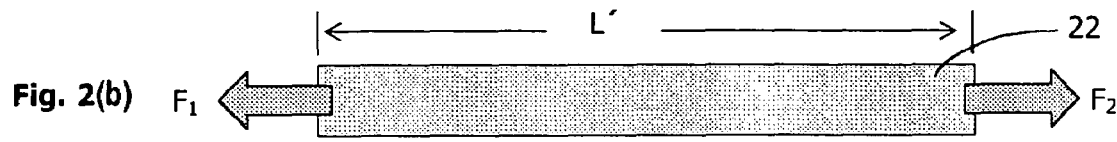
Fig. 2(b)
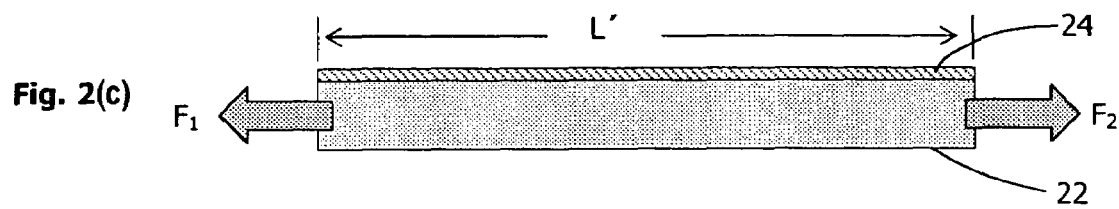
Fig. 2(c)
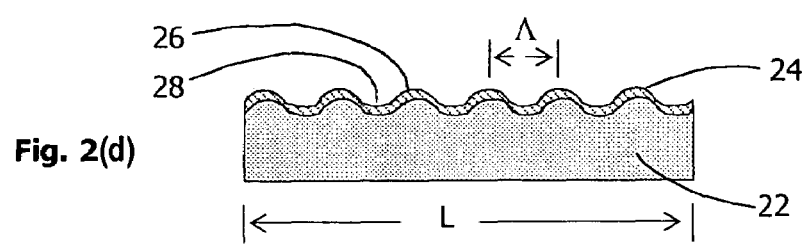
Fig. 2(d)
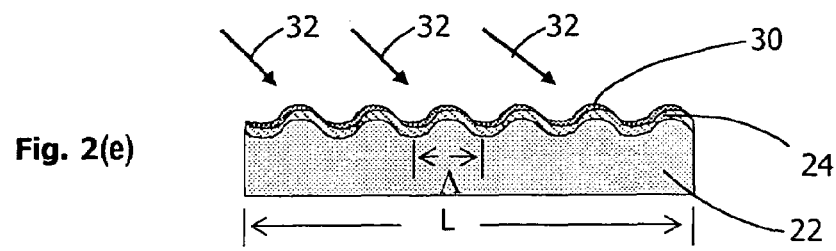
Fig. 2(e)
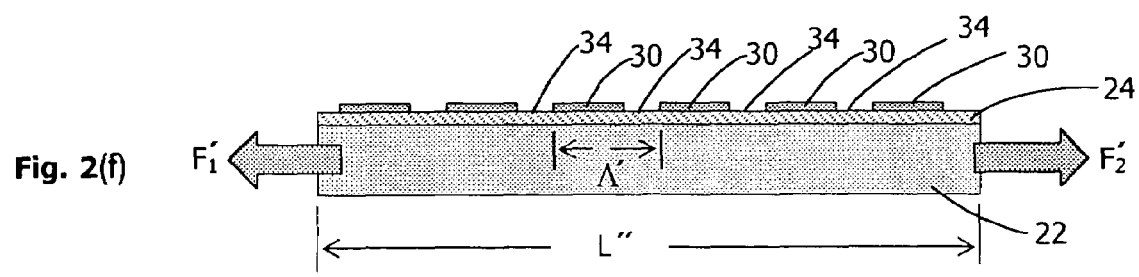
Fig. 2(f)
Figure 2

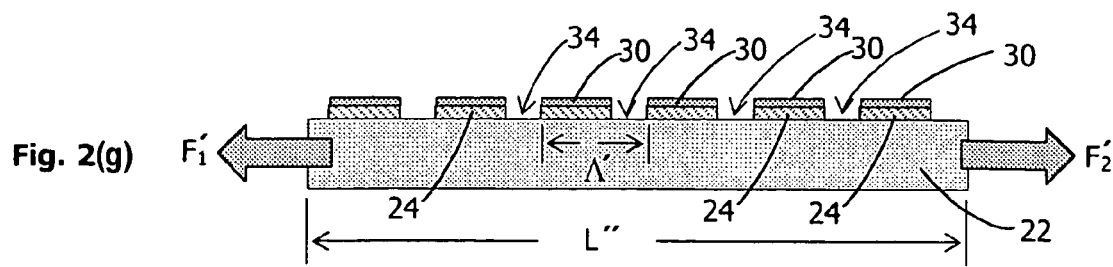
Fig. 2(g)
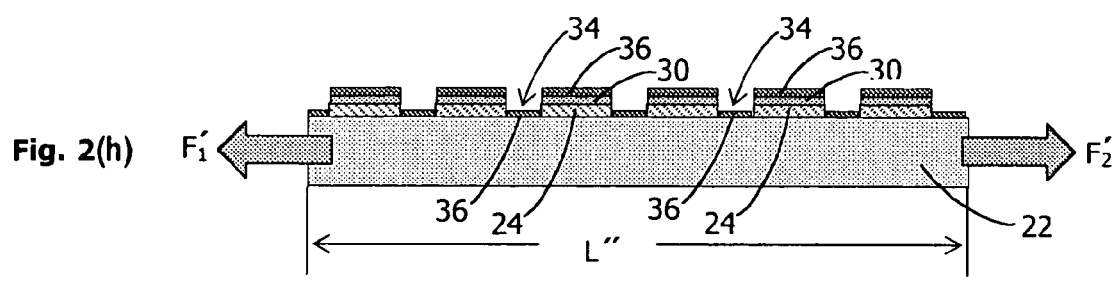
Fig. 2(h)
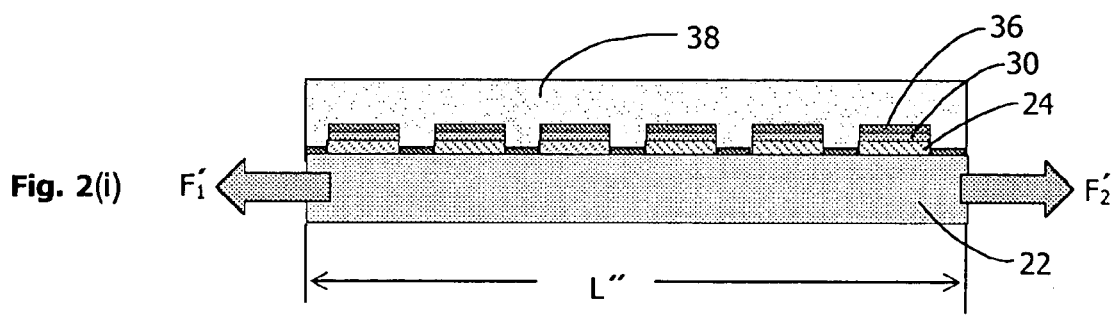
Fig. 2(i)
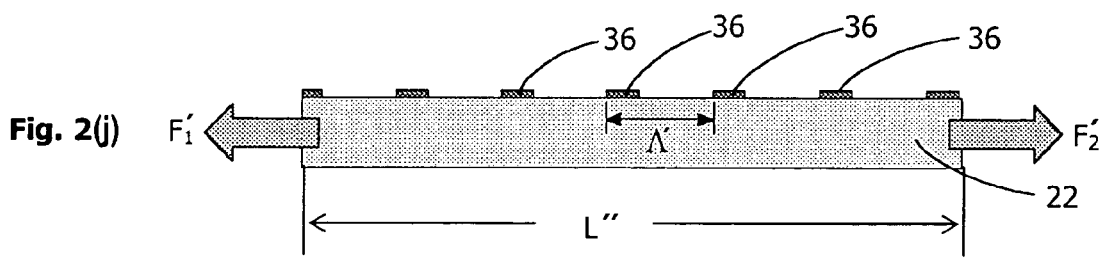
Fig. 2(j)
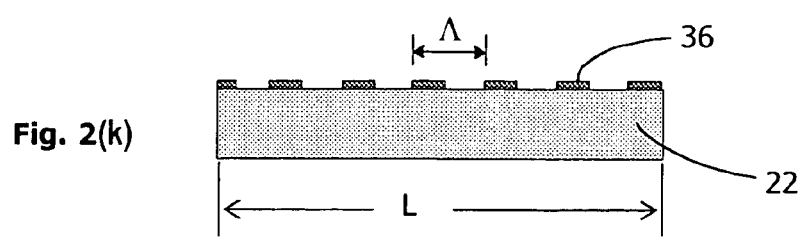
Fig. 2(k)
Figure 2 (Continued)

NON-PHOTOLITHOGRAPHIC METHOD FOR FORMING A WIRE GRID POLARIZER FOR OPTICAL AND INFRARED WAVELENGTHS

BACKGROUND

1. Field of the Invention

The present invention relates to wire grid polarizers. More particularly, this invention pertains to a non-photolithographic method for fabricating wire grid polarizers.

2. Description of the Prior Art

The most significant application of polarizers at the present time is for direct view liquid crystal displays (LCD's). These are commonly employed in laptop computers, thin desktop monitors, television displays and related applications.

Various types of polarizers currently exist, including those of the dichroic, wire grid, anisotropic crystal and multi-layer thin-film type. Various considerations have led to the nearly-universal employment of polarizers of the dichroic absorption type pioneered by Edwin Land sixty years ago in LCD displays. Naturally-occurring birefringent anisotropic crystals are of insufficient size for use in the most commonly encountered LCD display sizes while the fabrication of synthetic crystals of such dimension is prohibitively expensive. Multi-layer thin-film polarizers, which rely upon the Brewster angle effect, require that a glass substrate be tilted at a nominal 45 degree angle to the display. Such a geometry can add substantial and undesirable bulkiness to the display, often ruling such technology out of potential applications.

Wire grid polarizer technology offers some inherent advantages over dichroic absorptive polarizers. While a wire grid polarizer operates by the reflection and transmission of light, and is therefore neither temperature sensitive nor does it absorb excessive amounts of energy, a dichroic absorptive polarizer operates by the selective absorption and transmission of light. As such, a dichroic based polarizer exhibits temperature sensitivity due to (a) sensitivity of the organic dye to degradation in the presence of heating and (b) thermal rearrangement (relaxation) of the polymer alignment achieved by stretching the polymer to line up the dye molecules. Such temperature sensitivity limits the types of manufacturing process that may be employed to create dichroic adsorptive polarizers. The relatively low temperature processes available are often sub-optimal in terms of yield, quality and cost.

The wire grid polarizer comprises an array of closely-spaced parallel conductive lines supported by a transmitting substrate. A perspective schematic view of such a polarizer is illustrated in FIG. 1. As can be seen, the polarizer 10 comprises an array of parallel conductive lines 12 on a transparent substrate 14. Each of the conductive lines is characterized by a thickness t, a width w and a periodic separation (or period) Λ with respect to the adjacent line(s). In operation, unpolarized light 16 is incident at an angle φ. (Note: the angle of incidence φ may be zero; that is the light 16 may be normal to the surface of the polarizer 10). A portion 18 of the incident light 16 is reflected while another portion 20 is transmitted. The reflected portion 18 is almost entirely s-polarized (electric vector parallel to the direction of the conductive lines 12) while the transmitted portion 20 is almost entirely p-polarized (electric vector perpendicular to the direction of the conductive lines 12).

Ideally, a wire grid polarizer functions as a perfect mirror for one plane of polarization (e.g. s-polarized light) and is perfectly transparent to the orthogonal plane of polarization (e.g. p-polarized light). In practice, even the most reflective metals absorb some fraction and reflect only 80 to 95 percent of incident light. Similarly, due to surface reflections, a nominally transparent substrate does not transmit 100 percent of incident light. Polarizer performance over the range of wavelengths and incidence angles of interest is characterized by the contrast ratios of the transmitted ($T_p/T_s$) and reflected ($R_s/R_p$) beams and optical efficiency (percentage of incident unpolarized light transmitted).

The overall behavior of a wire grid polarizer is determined by the relationship between (1) the center-to-center spacing, or periodicity, of the parallel conductive lines and (2) the wavelength of incident radiation. Only when the periodicity, Λ, of the lines is smaller than the wavelength of interest can the array behave like a polarizer. If the periodicity of the lines should exceed the wavelength of interest, the grid will function as a diffraction grating. Further, there exists a transition region, in which periodicity of the conductive lines falls in the range of roughly one-third to twice the wavelength of interest (i.e., $2\lambda \geq \Lambda\_ \geq \lambda/3$). Large, abrupt changes are observed to occur in such transition region, namely increases in reflectivity coupled with corresponding decreases in reflectivity for p-polarized light. Such "Raleigh resonances" occur at one or more specific wavelengths for any given angle of incidence. As a result, wire grids having periodicities that fall within such transition region are unsuitable for use as polarizers.

Wire grid polarizers were developed for use in the millimeter-wave and microwave frequency ranges. They were initially unavailable for use in the infrared and visible wavelength ranges due to the inability of then-existing processing technologies (e.g. stretching thin wires over a mandrel) to produce parallel conducting lines of sufficiently small periodicity.

The application of photolithography overcame the problem of attaining the requisite small periodicities. See, for example, U.S. Pat. No. 4,049,944 of Garvin et al. Covering "Process for Fabricating Small Geometry Semiconductive Devices Including Integrated Components" which teaches, in part, a method for fabrication of wire grid polarizers employing holographic exposure of photolithographic materials. Other applications of photolithography in methods for forming wire grid polarizers are taught, for example, in the following United States patents: U.S. Pat. No. 6,122,103 of Perkins et al. covering "Broadband Wire Grid Polarizer For the Visible Spectrum" and U.S. Pat. No. 6,665,119 of Kurtz et al. covering "Wire Grid Polarizer".

U.S. Pat. No. 3,046,839 of Bird et al. covering "Process For Preparing Light Polarizing Materials" and U.S. Pat. No. 4,456,515 of Krueger et al. covering "Method For Making Polarizers Comprising a Multiplicity of Parallel Electrically Conductive Strips on a Glass Carrier" disclose photolithographic processes for forming wire grid polarizers that eliminate difficult etching steps. A thin layer of metal is deposited at an oblique angle to the substrate after a photolithographic pattern of finely spaced parallel lines is fabricated directly on a transparent substrate. The oblique angle of incidence, coupled with periodic topographic steps in the resist pattern, cause the metal to accumulate primarily on the sidewalls of the pattern. When photoresist is subsequently washed away, only the thin metal lines that are attached to the substrate between ridges of photoresist and accumulated on the sidewalls of the resist pattern remain.

Photolithographic techniques for reducing the periodicity of parallel conductive lines from approximately one micrometer (limiting the resultant devices to the near IR spectrum) to approximately 0.1 micrometer (suitable for the visible spectrum) has been disclosed, for example, by Karthe (see Wolfgang Karthe, "Nanofabrication Technologies and Device Integration", *Proceedings of SPIE*, vol. 2213 (July 1994), pp. 288-296).

Techniques for fabricating wire grid polarizers by methods employing photolithography face inherent and well-recognized limitations. First, the lengths of the sides of the area that can be exposed during a single exposure (and, hence, the size of the polarizer) are limited to a few inches. This is far too small for most direct view displays such as those employed in laptop computers. Secondly, the cost of photolithographic processes is rather high due to the costs of high-resolution photolithography systems, and the requisite ultra-high quality clean room facility required to house such a system.

SUMMARY OF THE INVENTION

The preceding and other shortcomings of the prior art are addressed by the present invention that provides, in a first aspect, a method for forming a plurality of substantially-straight metallic lines of predetermined periodicity Λ on a thin film substrate of elastomeric material having an unstressed length.

Such method is begun by applying a first uniaxial tensile force to stress the substrate whereby it is elongated from its unstressed length to a first stressed length. It is then coated with a sacrificial layer of material. The first uniaxial tensile force is then removed from the coated substrate whereby the substrate assumes substantially its unstressed length and the material of the sacrificial layer buckles to assume a repetitive undulating topology of periodicity Λ.

A masking layer of material is then deposited at an oblique angle with respect to the buckled sacrificial layer so that the material of the masking layer is arranged into regions of alternating thickness of periodicity Λ. A second uniaxial tensile force that exceeds the first uniaxial tensile force is then applied to the substrate to elongate it to a second stressed length that exceeds the first stressed length whereby material of the masking layer is fractured into a plurality of lines of periodicity Λ.

The regions of the sacrificial layer lying between the lines of material of the masking layer are removed. A metallic layer is then deposited onto the structure whereby it overlies the lines of the masking layer and exposed portions of the substrate. The lines of material of the masking layer, underlying portions of the sacrificial layer and portions of the metallic layer that overlie the lines of material of the masking layer are then removed. Finally, the second uniaxial tensile force is removed from the substrate, relaxing it to substantially its unstressed length.

In a second aspect, the invention provides a wire grid polarizer formed by the above-described process.

The preceding and other features of the invention will become further apparent from the detailed description that follows. Such description is accompanied by a set of drawing figures. Numerals of the drawing figures, corresponding to those of the written text, point to the features of the invention with like numerals referring to like features throughout both the written description and the drawing figures.

BRIEF DESCRIPTION OF THE DRAWINGS

FIGS. 2(a) through 2(k) are a series of views for illustrating the method of the invention for forming a plurality of substantially-parallel metallic lines on an elastomeric substrate.

DETAILED DESCRIPTION OF THE PREFERRED EMBODIMENT

Figure 1:
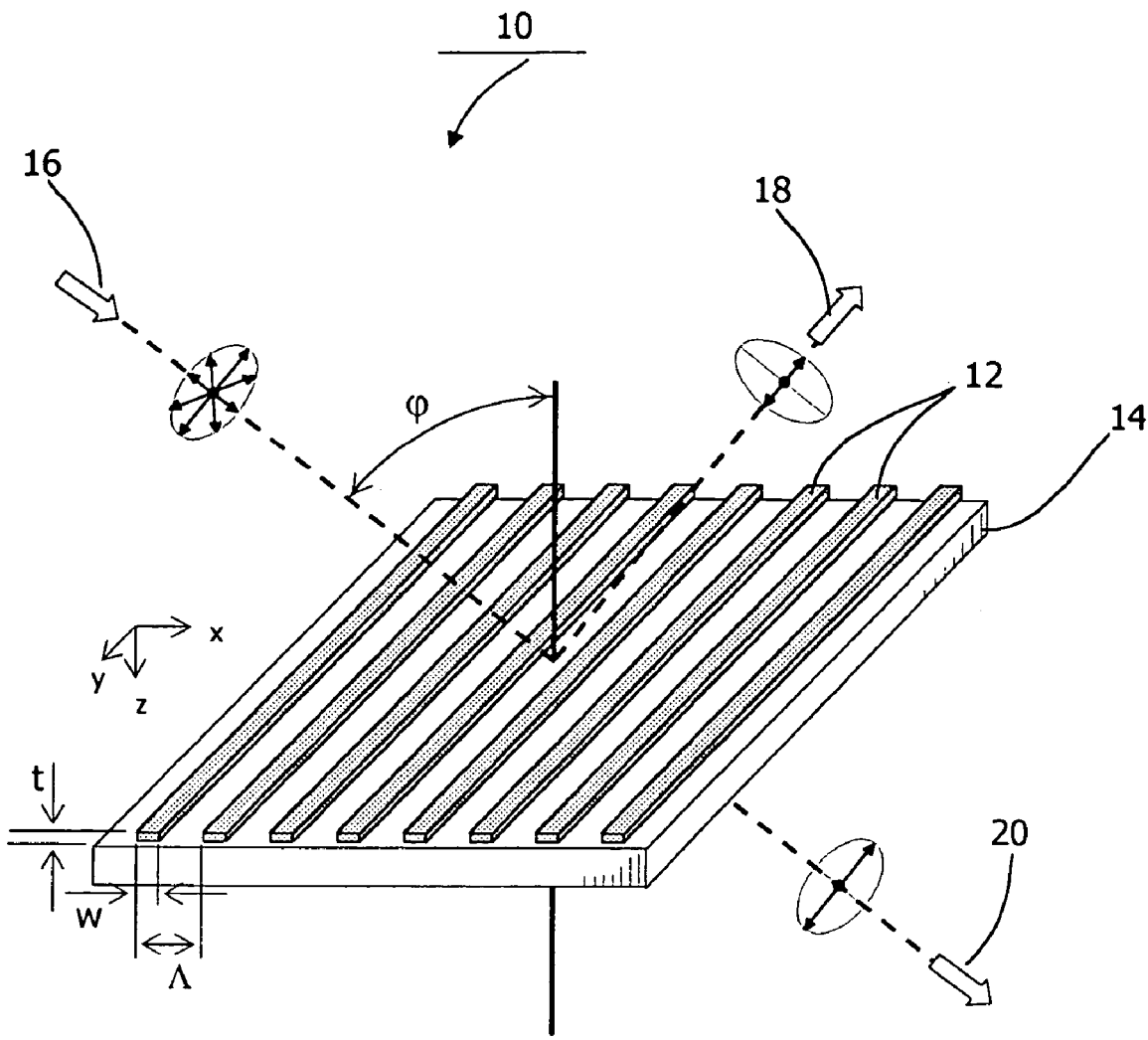
FIG. 1 is a perspective view of a wire grid polarizer in accordance with the prior art for illustrating is principle of operation.

The present invention provides a method for forming a wire grid polarizer characterized by parallel conductive lines of periodicities suitable for operation in the visible and infrared spectra. Unlike prior art techniques that rely upon photolithography to achieve the requisite small periodicities, the method of the present does not employ any photolithography and is therefore not subject to the resultant limitation of device size and capital equipment cost attendant to photolithographic processes.

FIGS. 2(a) through 2(k) illustrate the process of the invention for forming a wire grid polarizer suitable for operation, inter alia, at visible and infrared wavelengths. The process is begun by providing a substrate 22 comprising a thin film of elastomeric material having an unstressed length "l" and suitable elastic modulus as illustrated in FIG. 2(a). An example of an appropriate elastomeric film for the substrate 22 is one of 100 micron thickness poly(dimethylsiloxane) which is commercially available from Dow Corning Corporation under the trademark SYLGARD 184. Such material is formulated to possess an elastic capacity permitting it to be axially stretched to up to 100 percent of its length without breaking. Opposed uniaxial stretching forces $F_1$ and $F_2$ are applied to the substrate 22 in FIG. 2(b) to elongate it to "l'".

In FIG. 2(c), the stressed substrate 22 is coated with a material, preferably of a thickness of approximately 0.5 μm, forming an overlying sacrificial layer 24. The material of the sacrificial layer 24 preferably comprises a water-soluble polymer that is readily susceptible to a reactive ion etch process. Other materials are suitable for the sacrificial layer 24, subject to (1) susceptibility to a reactive etch process and (2) use of a suitable solvent for performing and effecting a lift-off process described below.

Water soluble polymers fall into several classes, a selection of which are listed below:

(1) Polymers with carboxylic acid groups and their salts with monovalent cations: poly(acrylic acid); poly(methacrylic acid); poly(maleic acid); their sodium, potassium, and ammonium salts.

(2) Polymers with amide groups: poly(acrylamide); poly (methacrylamide).

(3) Polymers with groups that have hydroxyl substituents: poly(hydroxyethyl acrylate); poly(2-hydroxypropyl methacrylate); poly(vinyl alcohol).

(4) Polymers with many ether groups, and possibly some hydroxyl end groups: poly(ethylene glycol); a polymer of poly(ethylene glycol) monomethacrylate.

(5) Polymers with sulfonic acid groups or their salts with monovalent cations; poly(styrenesulfonic acid); poly(styrenesulfonic acid, sodium salt); poly(vinylsulfonic acid, sodium salt).

(6) Polymers that have many imine or amine groups: poly(ethylene imine); poly(vinylamine).

(7) Polymers that are linear chains of sugar groups: agar; soluble starches; hydroxyethylcellulose.

(8) Polymers that are linear chains of amino acids, or have cyclized amino acid groups: gelatin; poly(vinylpyrrolidone).

(9) Phenol-formaldehyde resins in the form of their sodium salts: resole.

(10) Combinations in copolymers, including some containing units that are not water soluble: poly(acrylamide-co-acrylic acid); poly(maleic acid-co-methyl vinyl ether); poly(vinyl alcohol-co-vinyl acetate); poly(vinylpyrrolidone-co-vinyl acetate).

The sacrificial layer 24 is applied in liquid form onto the substrate 22 and thereafter allowed to dry in the atmosphere. Alternatively, the sacrificial layer 24 may be deposited onto the substrate 22 in a vacuum evaporator or formed as a separate film and thereafter laminated onto the stressed film of the substrate 22.

As shown in FIG. 2(d), removal of the axial stretching forces $F_1$ and $F_2$ from the substrate 22 results in its approximate return to original length l and buckling of the sacrificial layer 24. Such buckling results in an undulating topology comprising parallel rows of ridges 26 and valleys 28. According to buckling theory, the resultant periodicity Λ of such undulations is determined in accordance with the following relationship:

$$\Lambda/t = [\Pi^2 E_2/6(1-v_1^2)E_1(\delta L/L)]$$

Where:
t=thickness of the deposited layer 24
$E_1$=Young's modulus of the thin film 22
$E_2$=Young's modulus of the deposited layer 24
$v_1$=Poisson's ratio of the thin film 22
L=original length before stretching
δL=change in length of thin film 22 when stretched/just prior to depositing layer 24 (=l'−l)

In FIG. 2(e) a masking layer 30 comprising a thin film of either metallic or dielectric material is deposited an oblique angle 32 in a vacuum deposition process onto the above-described topology of the sacrificial layer 24. As can be seen, the resultant deposited masking layer 30 is characterized by a continuum of alternating thicknesses that repeat and track the periodicity Λ of the undulations of the sacrificial layer 24. In general, greater thicknesses of the masking layer 30 are created at portions overlying where the undulating sacrificial layer 24 is to the "windward" side of the oblique angle 32 deposition while lesser thicknesses are deposited at portions overlying areas of the sacrificial layer 24 that are "leeward" to the oblique deposition. Oblique deposition of a thin metallic layer onto a buckled surface topology to form a metal layer that is periodically thicker and thinner for subsequent fracture upon stressing to form parallel metal lines is taught by F. Katzenberg, "Cost-Effective Production of Highly Regular Nanostructured Metallization Layers", *Nanotechnology*, vol. 14 (2003), pp. 1019-1022.

The use of a dielectric material is possible in the present invention as the masking layer 30 does not ultimately constitute the parallel conductive lines of the wire grid polarizer. Preferred metals for deposition include aluminum, nickel, copper, tungsten and alloys of tungsten and titanium, all being metals that deposit upon the sacrificial layer 24 with low internal strain. Examples of appropriate dielectric materials for deposition as the masking layer 30 include, but are not limited to sodium chloride, silicon dioxide and silicon nitride all being materials that fracture easily. The angle of incidence 32 is preferably approximately 45 degrees.

Axially-directed Forces $F_1'$ and $F_2'$ are then applied as shown in FIG. 2(f), elongating the elastomeric substrate 22 to l". Such elongation of the substrate 22 results in fracturing of the masking layer 30 at its periodically-distributed thinned regions, causing the formation of periodically-distributed parallel lines of material of the masking layer 30 separated by spacings 34. Since the sacrificial layer 24 was deposited, as illustrated in FIG. 2(c), onto the then-elongated (to l') substrate 22, the net tensile force resulting from the forces $F_1'$ and $F_2'$ must exceed that originally applied as the stressed length of the substrate 22, l", must exceed the prior stressed length l' for fracturing of the sacrificial layer 24 to occur. Also, the periodicity of the periodically-distributed lines of the masking layer assumes a new value Λ' that somewhat exceeds Λ due to the increased stressed length (l" versus l') of the substrate 22.

The widths of the spacings 34 are preferably between λ/5 and λ/10. Such spacings 34 will be seen to determine the widths of the parallel conductive (metal) lines of a wire grid polarizer formed by the process described herein. (Note: the periodicity of the parallel conductive lines should be λ/3 or less for a device to function efficiently as a polarizer.)

The device is then subjected to a reactive ion etch process while axial forces $F_1$ and $F_2$ continue to be applied and the spacings 34 maintained. In such a process, the device is placed in a vacuum processing chamber where the reactive ion etching process removes the portions of the sacrificial layer 24 exposed by the spacings 34 while the periodically-distributed portions of the masking layer 30 protect underlying portions of the sacrificial layer 24, leaving the structure illustrated in FIG. 2(g).

A thin metallic layer 36 is then vacuum deposited over the surface while the elastomeric substrate 22 continues to be stretched. The evaporant forming the thin metallic layer 36 is preferably normally incident upon the surface to facilitate subsequent lift-off, discussed below. Periodically-distributed portions of the thin metallic layer will be seen to form the conductive lines of the wire grid polarizer formed by the process herein. Materials suitable for forming the thin metallic layer include, but are not limited to, aluminum, gold, silver and nickel. Each of such materials is characterized by, among other characteristics, good reflection in the wavelengths of interest. As can be seen in FIG. 2(h), the thin metallic layer 36 alternately coats the spacings 34 and the periodically-distributed portions of masking layer 30 that overlie the sacrificial layer 24.

In FIG. 2(i) the stressed device is immersed in a solvent 38 capable of dissolving the sacrificial layer 24. In the event the layer 24 comprises a water soluble polymer, as discussed above, water is a suitable choice of solvent. This results in dissolution of the remaining water soluble polymer material of the sacrificial layer 24, causing lift-off of the overlying layers 30 and 36. The result of such process is illustrated in FIG. 2(j). As can be seen, only the periodically-distributed portions of the thin metallic layer 36 remain.

The axial forces $F_1'$ and $F_2'$ for elongating the elastomeric substrate 22 to l" are then removed, leaving it to return to substantially its original dimensions with the periodicity of the parallel conductive lines formed of the sections of the thin metallic layer 36 that remain after the lift-off process being reduced from Λ' to the predetermined value of Λ. The resultant wire grid polarizer is shown in FIG. 2(k).

Thus it is seen that present invention addresses the problems that have plagued the fabrication of wire grid polarizers of sufficiently small periodicities by providing a fabrication process characterized by (1) using a separate sacrificial coating material to form the thin buckling layer (the layer 24), (2) selectively removing portions of the sacrificial coating material by a reactive ion etching, (3) depositing a thin metal layer (the layer 36) of composition and thickness chosen for optical performance and (4) employing a lift-off process that relies upon the solubility of the sacrificial layer to remove unwanted structures later.

By employing the teachings of the invention, one may realize the advantages of wire grid polarizer performance, including minimal energy absorption, temperature insensitivity and the resulting economies of low energy consumption and long life, at wavelengths requiring extremely small periodicities. In contrast to prior art techniques for forming such polarizers, the method of the invention is not limited by characteristics inherent in the use of photolithography, including small display size and substantial capital investment.

While this invention has been described with reference to its presently preferred embodiment, it is not limited thereto. Rather, this invention is limited only insofar as it is described by the following set of patent claims and includes within its scope all equivalents thereof.

What is claimed is:

1. A method for forming a plurality of substantially-straight metallic lines of predetermined periodicity $\Lambda$ on a thin film substrate of elastomeric material having an unstressed length, said method comprising the steps of:
   a) applying a first uniaxial tensile force to stress said substrate whereby said substrate is elongated from said unstressed length to a first stressed length; then
   b) coating said elongated substrate with a sacrificial layer of material; then
   c) removing said first uniaxial tensile force from said coated substrate whereby said substrate assumes substantially said unstressed length and said material of said sacrificial layer buckles to assume a repetitive undulating topology of periodicity $\Lambda$; then
   d) depositing a masking layer of material at an oblique angle with respect to said buckled layer so that said material of said masking layer is arranged into regions of alternating thickness of periodicity $\Lambda$; then
   e) applying a second uniaxial tensile force that exceeds said first uniaxial tensile force to said substrate so that said substrate is elongated to a second stressed length exceeding said first stressed length whereby said material of said masking layer is fractured into a plurality of lines of periodicity $\Lambda'$; then
   f) removing regions of said sacrificial layer that lie between said lines of material of said masking layer; then
   g) depositing a metallic layer onto said substrate whereby said metallic layer overlies said lines of said masking layer and exposed portions of said substrate; then
   h) removing said lines of material of said masking layer, underlying portions of said sacrificial layer and portions of said metallic layer that overlie said lines of material of said masking layer, leaving parallel lines of said metallic layer of periodicity $\Lambda'$ that directly overlie said substrate; and then
   i) removing said second uniaxial tensile force from said substrate whereby said substate is relaxed to substantially said unstressed length the periodicity of said lines of material of said metallic layer is reduced to $\Lambda$.

2. A method as defined in claim 1 wherein said sacrificial layer comprises a water-soluble polymer.

3. A method as defined in claim 2 further including the step of removing said lines of material of said masking layer, underlying portions of said sacrificial layer and portions of said metallic layer that overlie said lines of material of said masking layer by a lift off process.

4. A method as defined in claim 3 wherein said lift off process includes the step of applying water as solvent.

5. A method as defined in claim 1 wherein said substrate comprises poly(dimethylsiloxane).

6. A method as defined in claim 1 wherein said masking layer comprises metallic material.

7. A method as defined in claim 1 wherein said masking layer comprises dielectric material.

8. A method as defined in claim 1 further comprising the step of removing regions of said sacrificial layer that lie between said lines of material of said masking layer by reactive ion etching.

9. A method as defined in claim 1 further including the step of vacuum deposition of said masking layer.

10. A wire grid polarizer formed by the process of:
    a) applying a first uniaxial tensile force to stress a thin film substrate of elastomeric material having an unstressed length whereby said substrate is elongated from said unstressed length to a first stressed length; then
    b) coating said elongated substrate with a first layer of material; then
    c) removing said first uniaxial tensile force from said coated substrate whereby said substrate assumes substantially said unstressed length and said material of said first layer buckles to assume a repetitive undulating topology of periodicity $\Lambda$; then
    d) depositing a second layer of material at an oblique angle with respect to said buckled first layer so that said material of said second layer is arranged into regions of alternating thickness of periodicity $\Lambda$; then
    e) applying a second uniaxial tensile force that exceeds said first uniaxial tensile force to said substrate so that said substrate is elongated to a second stressed length exceeding said first stressed length whereby said material of said second layer is fractured into a plurality of lines of periodicity $\Lambda'$; then
    f) removing regions of said first layer that lie between said lines of material of said second layer; then
    g) depositing a metallic layer onto said lines of material and regions exposed by removal of said regions of said first layer whereby said metallic layer overlies said lines of said second layer and exposed portions of said substrate; then
    h) removing said lines of material of said second layer, underlying portions of said first layer and portions of said metallic layer that overlie said lines of material of said second layer, leaving lines of material of said metallic layer of periodicity $\Lambda'$ that directly overlie said substrate; and then
    i) removing said second uniaxial tensile force from said substrate whereby said substate is relaxed to substantially said unstressed length the periodicity of said lines of material of said metallic layer is reduced to $\Lambda$.

11. A wire grid polarizer as defined in claim 10 wherein said first layer comprises a water-soluble polymer.

12. A wire grid polarizer as defined in claim 11 further including the step of removing said lines of material of said second layer, underlying portions of said first layer and portions of said metallic layer that overlie said lines of material of said second layer by a lift off process.

13. A wire grid polarizer as defined in claim 12 wherein said lift off process includes the step of applying water as solvent.

14. A wire grid polarizer as defined in claim 10 wherein said substrate comprises poly(dimethylsiloxane).

15. A wire grid polarizer as defined in claim 10 wherein said second layer comprises metallic material.

16. A wire grid polarizer as defined in claim 10 wherein said second layer comprises dielectric material.

17. A wire grid polarizer as defined in claim 10 further comprising the step of removing regions of said first layer that lie between said lines of material of said second layer by reactive ion etching.

18. A wire grid polarizer as defined in claim 10 further including the step of vacuum deposition of said second layer.

* * * * *